US009118374B2

(12) United States Patent
Haban et al.

(10) Patent No.: US 9,118,374 B2
(45) Date of Patent: Aug. 25, 2015

(54) INTEGRATED CIRCUIT WITH INTER-CHIP LINK FOR BOOT-UP

(71) Applicant: Silicon Laboratories Inc., Austin, TX (US)

(72) Inventors: Scott Thomas Haban, Austin, TX (US); Wei Han, Austin, TX (US); Younes Djadi, Austin, TX (US); Carroll S. Vance, Austin, TX (US)

(73) Assignee: SILICON LABORATORIES INC., Austin, TX (US)

( * ) Notice: Subject to any disclaimer, the term of this patent is extended or adjusted under 35 U.S.C. 154(b) by 0 days.

(21) Appl. No.: 14/083,074

(22) Filed: Nov. 18, 2013

(65) Prior Publication Data

US 2015/0139370 A1    May 21, 2015

(51) Int. Cl.
*H04B 7/10* (2006.01)
*H04B 7/08* (2006.01)

(52) U.S. Cl.
CPC ....................................... *H04B 7/08* (2013.01)

(58) Field of Classification Search
None
See application file for complete search history.

(56) References Cited

U.S. PATENT DOCUMENTS

| | | | |
|---|---|---|---|
| 2008/0282017 A1* | 11/2008 | Carpenter et al. | 710/316 |
| 2011/0158298 A1 | 6/2011 | Djadi et al. | |
| 2014/0200051 A1* | 7/2014 | Liu | 455/566 |

OTHER PUBLICATIONS

Silicon Storage Technology, Inc., "2 Mbit SPI Serial Flash," SST25VF020, S71231-07-000, Data Sheet, 23 pages, Oct. 2006, Sunnyvale, California.
Silicon Laboratories Inc., "High-Performance Automotive AM/FM Radio Receiver and HD Radio Tuner," Data Sheet, Si476x, 2 pages, Oct. 11, 2011.
Silicon Laboratories Inc., "Single-Chip, FM/HD/DAB/DAB+ Radio Receiver," Data Sheet, Si4688-A10, 2 pages, May 7, 2013.

* cited by examiner

*Primary Examiner* — Adolf Dsouza
(74) *Attorney, Agent, or Firm* — Polansky & Associates, P.L.L.C.; Paul J. Polansky

(57) ABSTRACT

An integrated circuit includes a first port for conducting a first plurality of signals, a second port for conducting a second plurality of signals, a data path coupled between the first port and the second port, a controller, and a processor having an input and an output. In a first mode, the controller causes the data path to conduct at least one signal received on the first port to the second port. In a second mode, the controller controls the processor to output signals to the second port.

15 Claims, 2 Drawing Sheets

INTEGRATED CIRCUIT WITH INTER-CHIP LINK FOR BOOT-UP

FIELD OF THE DISCLOSURE

The present disclosure relates generally to integrated circuits, and more particularly to integrated circuits with inter-chip links

BACKGROUND

Radio frequency (RF) receivers are used in a wide variety of applications such as radios, television receivers, cellular telephones, pagers, global positioning system (GPS) receivers, cable modems, cordless phones, and the like. As used herein, a "radio frequency" signal means an electrical signal conveying useful information and having a frequency from about 3 kilohertz (kHz) to thousands of gigahertz (GHz), regardless of the medium through which such signal is conveyed. Thus an RF signal may be transmitted through air, free space, coaxial cable, fiber optic cable, etc.

One of the problems with broadcast radio systems is the problem of signal reflection. A receiver may receive multiple versions of a transmitted signal with different strengths and phase shifts because of signal reflection through the transmission medium. These phase shifted versions can destructively interfere with the main received signal and degrade it. The problem is worse for systems such as automobile radio receivers that constantly change position relative to a fixed antenna and that will occasionally be subject to relatively strong reflected signals.

In an effort to compensate for the different signal reflection environments, engineers have developed diversity receivers. Diversity receivers receive broadcast signals using two or more antennas at different positions and/or orientations. The separately received signals are combined to provide a better output signal. One diversity receiver configuration uses multiple radio receiver chips each connected to its own separate antenna. The radio receiver chips use an inter-chip link to exchange data for combination into a final output signal.

The radio receiver chips are complex chips that may include a digital signal processor (DSP) and a general-purpose microcontroller each executing the same respective stored programs. Each radio receiver chip loads the stored programs from a single serial non-volatile memory chip into its own on-chip memory. Because it requires multiple chips, the time required for the diversity receiver to load software from the non-voltage memory into all the chips can be long, resulting in slow boot-up sequences.

BRIEF DESCRIPTION OF THE DRAWINGS

The present disclosure may be better understood, and its numerous features and advantages made apparent to those skilled in the art by referencing the accompanying drawings, in which.

Figure 1:
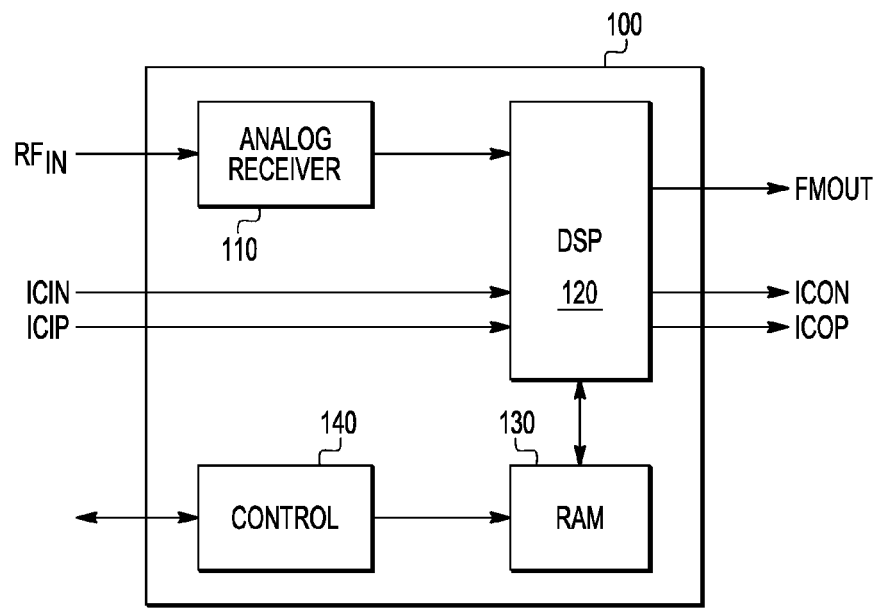
FIG. 1 illustrates in block diagram form an integrated circuit receiver with an inter-chip link known in the prior art.

In the following description, the use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

In one form, an integrated circuit such as a radio receiver chip includes a first port for conducting a first plurality of signals, a second port for conducting a second plurality of signals, a data path coupled between the first port and the second port, a controller, and a processor having an input and an output. In a first mode, the controller causes the data path to conduct at least one signal received on the first port to the second port. The first mode is useful, for example, in loading a common software image into local memories of each of the two integrated circuits. In a second mode, the controller controls the processor to output signals to the second port. The second mode is useful, for example, in implementing a diversity receiver system in which each of several integrated circuit receivers is connected to a different antenna and received data is shared between and processed by multiple radio receiver chips. Thus the integrated circuit can operate in both a boot-up mode and a normal operation mode quickly and with a small number of terminals. In other embodiments, the integrated circuit can be used for other systems that use multiple chips running common software during one mode and sharing unique data during a second mode besides diversity radio receivers.

In another form, a diversity receiver system includes a nonvolatile memory such as a serial FLASH and first and second integrated circuit receivers. The first integrated circuit receiver is coupled to the nonvolatile memory and has a first port, a second port, and a digital signal processor (DSP). The second integrated circuit receiver has a first port coupled to the second port of the first integrated circuit, and a second DSP. In a first mode, the first integrated circuit receiver reads data from the nonvolatile memory and provides the data to the second port. Thus data read by the first integrated circuit receiver is passed on to the second integrated circuit receiver. This operation is useful, for example, when the nonvolatile memory stores a software image that is loaded into multiple chips of a diversity receiver system. In a second mode, the first integrated circuit receiver provides data from the digital signal processor to the second port, and the second integrated circuit receiver provides data received from the first port to the DSP thereof.

In yet another form, a method has a first mode and a second mode. In the first mode, first data is read from a first port of a first integrated circuit and stored in a memory internal to the first integrated circuit. The first data is also provided to a second port of the first integrated circuit. The first mode can be, for example, a boot-up mode that loads a common software image into local memories of each of two or more integrated circuits. In the second mode, second data is formed in a processor of the first integrated circuit, and provided to the second port of the first integrated circuit. The second mode is useful, for example, in implementing a diversity receiver system in which each of several integrated circuit receivers is connected to a different antenna and received data is shared and processed by multiple integrated circuit receivers. However the method can be used for other systems that use multiple chips running common software during one mode and sharing unique data during a second mode besides diversity radio receivers. The method makes it possible to operate in both a boot-up mode and a normal operation mode quickly and with a small number of terminals.

FIG. 1 illustrates in block diagram form an integrated circuit receiver 100 with an inter-chip link known in the prior art. Integrated circuit receiver 100 has an input for receiving a radio frequency input signal labeled "$RF_{IN}$" from a signal source such as an antenna, not shown in FIG. 1, a pair of differential inter-chip link inputs labeled "ICIN" and ICIP", an output for providing a demodulated signal labeled "$FM_{OUT}$", a pair of differential inter-chip link outputs labeled "ICON" and "ICOP", and a bidirectional control port. Integrated circuit receiver 100 includes an analog receiver 110, a digital signal processor 120, a random access memory (RAM) 130, and a control block 140. Analog receiver 110 has an input for receiving the $RF_{IN}$ signal, and an output. DSP 120 has an input connected to the output of analog receiver 110, inputs for receiving the ICIN and ICIP signals, an output for providing the $FM_{OUT}$ signal, outputs for providing the ICON and ICOP signals, and a bidirectional memory access port. RAM 130 has a bidirectional port connected to the bidirectional memory access port of DSP 120, and an input port. Control block 140 is connected to the bidirectional control port of integrated circuit receiver 100 and has an output connected to RAM 130.

Integrated circuit receiver 100 is capable of performing reception of $RF_{IN}$ signals in a variety of formats, including worldwide FM and AM radio, weather band, shortwave, and long wave frequencies. Analog receiver 110 converts the $RF_{IN}$ signal to a digital baseband signal, and DSP 120 performs further processing and demodulation of the baseband signal to provide an output signal, such as the $FM_{OUT}$ signal shown in FIG. 1. In addition, integrated circuit receiver 100 is suitable for use in a diversity receiver system in which additional integrated circuit receivers similar or identical to integrated circuit receiver 100 are interconnected using the ICIN, ICIP, ICON, and ICOP signals. In such a system each integrated circuit receiver is connected to a separate antenna, and processes its respective $RF_{IN}$ signal such that the DSP of one of the integrated circuit receivers can combine all the signals.

The DSP in each integrated circuit receiver operates under the control of software that is loaded into RAM 130. The software is typically large in size to support various signal processing routines for all supported receiver formats. Integrated circuit receiver 100 is connected via control block 140 to an external non-volatile memory that stores the software image. On boot-up, control block 140 reads the data from the external non-volatile memory and stores it in RAM 130. To reduce pin count, control block 140 uses a serial communication format such as the serial peripheral interface (SPI) format, which is compatible with many commercial non-volatile memory chips. The amount of time required to load the software for one chip using a serial format is extensive. In a diversity receiver system, this amount of time is multiplied by the number of integrated circuit receiver chips, leading to long boot-up times.

Figure 2:
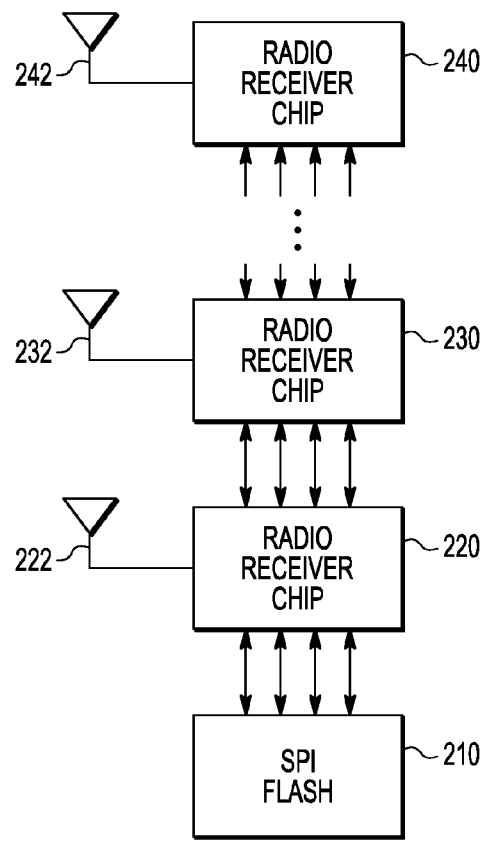
FIG. 2 illustrates in partial block diagram and partial schematic form a diversity receiver system according to one embodiment.

FIG. 2 illustrates in partial block diagram and partial schematic form a diversity receiver system 200 according to one embodiment. Diversity receiver system 200 includes an arbitrary number of radio receiver chips, in which the arbitrary number is equal to two or more, in a manner that results in lower overall pin count and faster boot-up. Shown in FIG. 2 is a representative set of radio receiver chips 220, 230, and 240 each connected to an antenna 222, 232, and 242, respectively, and a nonvolatile memory in the form of an SPI FLASH 210. As will be described, the radio receiver chips are connected together in a chain using bidirectional data ports. The radio receiver chips are each capable of operating in a first (boot-up) mode and a second (normal operation) mode.

In the boot-up mode, the radio receiver chips pass software images from SPI FLASH 210 from one chip to another such that the boot-up appears to occur substantially in parallel. Radio receiver chip 220 operates as a "SPI master" chip and initiates the sequential reading of data from SPI FLASH 210 over its first port. However unlike known systems, diversity receiver system 200 leverages the existing connections for diversity reception to pass the software image being loaded from SPI FLASH 210 over its second port to the subsequent chip, i.e. radio receiver chip 230. Radio receiver chip 230 stores the software image in its internal RAM and passes the data to the subsequent chip. This process continues through the last chip, radio receiver chip 240.

While it is possible for radio receiver chip 220 to be pre-configured to operate as a SPI master and the remaining chips such as radio receiver chips 230 and 240 to be pre-configured to operate as SPI slaves, it is typically more economical for each chip to be designed the same and dynamically configured as either as master or slave since the amount of additional circuitry in each chip to support both master and slave operation is small. In this way the integrated circuit manufacturer need not maintain separate inventories of these chips.

Note that radio receiver system 200 allows data to be passed between the radio receiver chips for a variety of purposes. For example as mentioned above, the data can be received data presented as intermediated frequency (IF) signals for combination into a single output signal. The data can also be audio data. Moreover the data can be transferred between chips not only for diversity combination purposes, but also to allocate processing load between processors.

In another embodiment, the set of radio receiver chips can be configured to operate either as separate receivers in a diversity reception system, or separate tuners that receiver difference channels.

Moreover the SPI FLASH can be connected at either end of the chain, such as the "south" end as shown in FIG. 2, or the "north" end by connecting it to the second port of radio receiver chip 240. A program known as a bootloader can be used to configure each chip in the chain according to its assigned function in the system. The bootloader can receive and decode a command that configures each of the various switches and pads for the desired functions.

Figure 3:
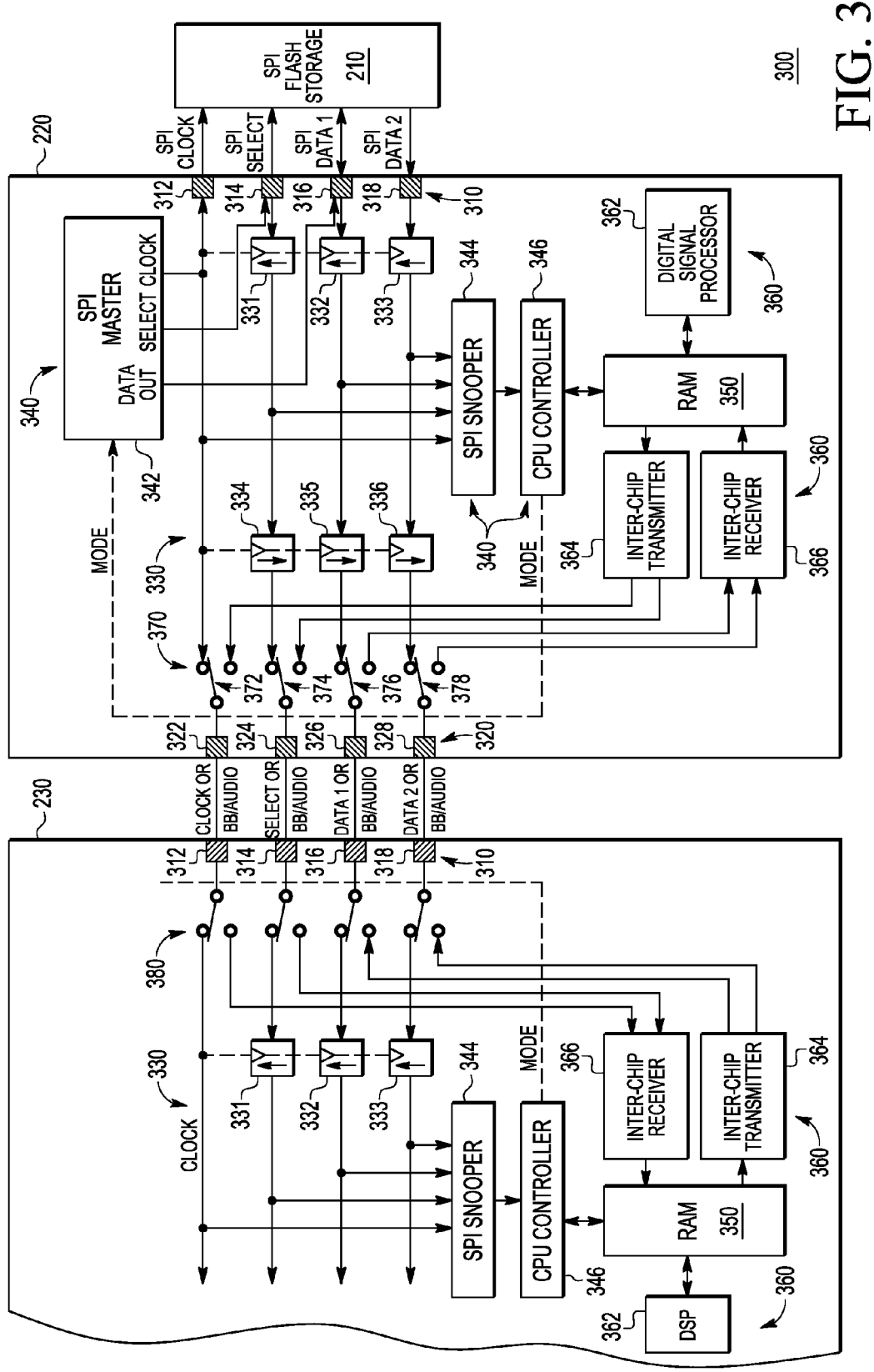
FIG. 3 illustrates in block diagram form a portion of the diversity receiver system of FIG. 2.

FIG. 3 illustrates in block diagram form a portion 300 of diversity receiver system 200 of FIG. 2. Portion 300 includes SPI FLASH 210 and radio receiver chips 220 and 230 as in FIG. 2 but now showing additional details of each.

SPI FLASH 210 has a clock input for receiving a signal labeled "SPI CLOCK", a control input for receiving a signal labeled "SPI SELECT", a bidirectional terminal for conducting a signal labeled "SPI DATA1", and an output terminal for providing a signal labeled "SPI DATA2".

Radio receiver chip 220 has a first port 310 that serves as an interface to SPI FLASH 210, and a second port 320 that serves as an interface to radio receiver chip 230, a data path 330, a controller 340, a memory 350, a processor 360, and a set of switches 370. First port 310 includes four integrated circuit terminals 312, 314, 316, and 318 for conducting the SPI CLOCK, SPI SELECT, SPI DATA1, and SPI DATA2 signals, respectively. Second port 320 includes four integrated circuit terminals 322, 324, 326, and 328 for providing output signals labeled "CLOCK OR BB/AUDIO", "SELECT OR BB/AUDIO", "DATA1 OR BB/AUDIO", and "DATA2 OR BB/AUDIO", respectively. Data path 330 has a first lane for connecting terminals 312 and 322 though one input of a single pole, double throw (SPDT) switch 372, a second lane for connecting terminals 314 and 324 through a combination of a rising edge latch 331, a falling edge latch 334, and an SPDT switch 374, a third lane for connecting terminals 316 and 326 through a combination of a rising edge latch 332, a falling edge latch 335, and an SPDT switch 376, and a fourth lane for connecting terminals 318 and 328 through a combination of a rising edge latch 333, a falling edge latch 336, and an SPDT switch 378. Each latch has a data input, a data output, and a clock input for receiving the SPI CLOCK signal and captures data on the rising or falling edge of the SPI CLOCK signal as the case may be. Each SPDT switch has a common terminal connected to a respective terminal of second port 320, a first terminal connected to terminal 312 in the case of SPI CLOCK or to the output terminal of a respective latch otherwise, and a second terminal.

Controller 340 includes a SPI master 342, a SPI snooper 344, and a data processor in the form of a CPU controller 346. SPI master 342 has an input for receiving a control signal labeled "MODE", a first output labeled "CLOCK" for providing the SPI CLOCK signal, a second output labeled "SELECT" connected to bonding pad 314, and a third output labeled "DATA OUT" connected to bonding pad 316. SPI snooper 344 has a first input for receiving the SPI CLOCK signal, and additional inputs connected to the outputs of each latch 332, and an output. CPU controller 346 has an input connected to the output of SPI snooper 344, an output for providing the MODE signal, and a bidirectional memory port.

Memory 350 is a multi-ported random access memory (RAM) and has a first bidirectional terminal connected to the bidirectional terminal of CPU controller 346, a second bidirectional terminal, a unidirectional output terminal, and a unidirectional input terminal.

Processor 360 includes a digital signal processor (DSP) 362, an inter-chip transmitter 364, and an inter-chip receiver 366. DSP 362 has a bidirectional terminal connected to the second bidirectional terminal of RAM, and other inputs and outputs connected to an analog receiver similar to analog receiver 110 of FIG. 1, which is not shown in FIG. 3. Inter-chip transmitter 364 has an input connected to the unidirectional output of memory 350, and outputs connected to the second terminals of switches 372 and 374 in the first and second lanes of data path 330. Inter-chip receiver 366 has inputs connected to the second terminals of switches 376 and 378 in the third and fourth lanes of data path 330, and an output connected to the unidirectional input of memory 350.

Radio receiver chip 230 has the same internal components as radio receiver chip 320, of which first port 310, a portion of data path 330, SPI snooper 344, CPU controller 346, memory 350, and controller 340, numbered the same as in radio receiver chip 220, are shown in FIG. 3. In addition, radio receiver chip 230 includes a set of SPDT switches 380 in data path 330 each of which includes a common terminal connected to a respective one of bonding pads 312, 314, 316, and 318, a first terminal in a respective one of the first, second, third, and fourth lanes, and a second terminal. Unlike in radio receiver chip 220, however, inter-chip receiver 366 has inputs connected to the second terminals of respective ones of switches 380 in the first and second lanes of data path 330, and inter-chip transmitter 364 has outputs connected to the second input terminals of respective ones of switches 380 in the third and fourth data lanes of data path 330.

In one embodiment, each of radio receiver chips 220 and 230 is generic and includes both sets of switches 370 and 380 to allow for operation as either a master or a slave. In this embodiment, a manufacturer need only maintain one design for both configurations and so is able to save photomask and inventory costs that would otherwise be associated with special purpose designs. In another embodiment, radio receiver chip 220 would only include switches 370 but not switches 380, while radio receiver chip 230 would only include switches 380 but not switches 370. Only radio receiver chip 220 would be configured to operate as the master and thus would have SPI master 342, whereas the additional radio receiver chips would not have SPI master 342 and thus could be smaller in integrated circuit area, saving cost.

In operation, a bootloader command can be used to configure each of radio receiver chips 220 and 230 as desired in the system, including the eight terminals in first and second ports, SPI master 342, and SPI snooper 344. CPU controller 346 provides the MODE signal to indicate whether radio receiver chip 220 is in the boot-up mode or the normal operation mode. After the end of reset, CPU controller 346 provides the MODE signal in a state to indicate the boot-up mode. In response, SPI master 342 provides a clock signal on its CLOCK terminal that is provided on bonding pad 312 as the SPI CLOCK signal. In addition, SPI master 342 activates its SELECT output to provide the SPI SELECT signal on bonding pad 314 in the active state. In response, SPI FLASH 210 begins outputting data as the SPI DATA2 signal and possibly also the SPI DATA1 signal to bonding pads 316 and 318, respectively. SPI master 342 also activates the DATA OUT output to cause bonding pad 316 to operate as an output terminal, which is abbreviated in FIG. 3 by showing the DATA OUT signal going to bonding pad 316. In data path 330, latches 331, 332, and 333 latch their respective input signals on the rising edge of the SPI CLOCK signal. Latches 334, 335, and 336 in turn latch the outputs of latches 331, 332, and 333, respectively, on the falling edge of the SPI clock signal. SPI master 342 selects the first terminal of each SPDT switch 370 to provide to the common terminal. Thus, radio receiver chip 220 provides the CLOCK, SELECT, DATA1, and DATA2 signals to corresponding input terminals in radio receiver chip 230. These data signals are provided to any additional chips in the system in a similar fashion.

SPI snooper 344 is used to store a software image in its internal memory 350. Thus as SPI FLASH 210 provides data that is conducted across data path 330, SPI snooper captures the data. CPU controller 346 receives the data and initiates memory cycles to store the data in the appropriate address in memory 350. SPI snooper 344 and CPU controller 346 in each subsequent radio receiver chip operates in a similar manner to load its software image in its internal memory 350.

By daisy-chaining the radio receiver chips to one chip whose SPI master 342 controls accesses to non-volatile memory, in this case SPI FLASH 210, the software image is loaded quickly and efficiently but without separate paths for each audio chip to SPI FLASH 210.

When the software image has been loaded into each respective memory 350, CPU controller 346 in audio receiver chip 220 switches to a normal operation mode. SPI master 342 select the second terminal of each SPDT switch 370 to provide to the common terminal. In this manner, audio data can be shared by radio receiver chips to provide a diversity receiver but without using any additional integrated circuit terminals. In this case, all four terminals can be used to transfer radio or audio data. For example, the first two lanes can provide a first differential pair of baseband modulated audio or data (or demodulated audio or data) signals, while the second two lanes provides a second differential pair of baseband modulated audio or data (or demodulated audio or data) signals, thus utilizing all lanes and transferring data efficiently.

The above-disclosed subject matter is to be considered illustrative, and not restrictive, and the appended claims are intended to cover all such modifications, enhancements, and other embodiments that fall within the true scope of the claims. For example, all radio receiver chips in the system could include the same circuitry and be configured in the system to operate as a master or slave, or alternatively separate chips could correspond to master and slave functions. In other embodiments, the radio receiver chip could include a different number of terminals to interface to an external FLASH memory or another type of external memory using different protocols besides SPI. For example, radio receiver chip 220 has two data terminals for interfacing to SPI FLASH 210 and supports either standard SPI (one data output pin) or dual SPI (one data output pin and one bidirectional data input/output pin).

Thus, to the maximum extent allowed by law, the scope of the present invention is to be determined by the broadest permissible interpretation of the following claims and their equivalents, and shall not be restricted or limited by the foregoing detailed description.

What is claimed is:

1. An integrated circuit comprising:
a first port for conducting a first plurality of signals;
a second port for conducting a second plurality of signals;
a data path coupled between said first port and said second port;
a controller comprising a snooper having an input coupled to said data path, and an output;
a processor having an input and an output; and
a memory coupled to said output of said controller,
wherein in a first mode, said controller causes said data path to conduct at least one signal received on said first port to said second port and stores data received from said data path in said memory; and
wherein in a second mode, said controller controls said processor to output signals to said second port.

2. The integrated circuit of claim 1, wherein said first and second ports comprise serial peripheral interface (SPI) ports, and said controller comprises an SPI master.

3. The integrated circuit of claim 1, wherein said controller further comprises:
a data processor having an input coupled to said output of said snooper, and an output coupled to said memory.

4. The integrated circuit of claim 3, wherein said data processor decrypts data received from said snooper and stores said data so decrypted in said memory.

5. The integrated circuit of claim 1, wherein said first mode comprises a bootstrap mode, and said second mode comprises a normal operation mode.

6. An integrated circuit comprising:
a first port for conducting a first plurality of signals;
a second port for conducting a second plurality of signals;
a data path coupled between said first port and said second port;
a controller; and
a processor having an input and an output, wherein said processor further comprises:
an analog receiver having an input for receiving a radio frequency input signal, and an output; and
a digital signal processor, wherein said digital signal processor further has an input coupled to said output of said analog receiver, and an output coupled to an signal output of the integrated circuit,
wherein in a first mode, said controller causes said data path to conduct at least one signal received on said first port to said second port; and
wherein in a second mode, said controller controls said processor to output signals to said second port.

7. The integrated circuit of claim 6, wherein:
said controller comprises a snooper having an input coupled to said data path, and an output; and
the integrated circuit further comprises a memory coupled to said output of said controller,
wherein in said first mode, said controller further stores said data in said memory while also providing said data to said second port.

8. An integrated circuit comprising:
a first port for conducting a first plurality of signals;
a second port for conducting a second plurality of signals;
a data path coupled between said first port and said second port;
a controller; and
a processor having an input and an output,
wherein in a first mode, said controller causes said data path to conduct at least one signal received on said first port to said second port; and
wherein in a second mode, said controller controls said processor to output signals to said second port and to input signals from said first port, wherein said processor alters a signal processing operation thereof in response to said signals input from said first port.

9. The integrated circuit of claim 8, wherein said processor comprises:
an analog receiver having an input for receiving a radio frequency input signal, and an output.

10. The integrated circuit of claim 9, wherein said processor comprises:
a digital signal processor having an input coupled to said output of said analog receiver, and an output coupled to an signal output of the integrated circuit.

11. A diversity receiver system comprising:
a nonvolatile memory;
a first integrated circuit receiver coupled to said nonvolatile memory and having a first port, a second port, and a first digital signal processor, wherein said first integrated circuit receiver is coupled to a first antenna and comprises:
a first analog receiver having an input coupled to said first antenna, and an output; and
wherein said first digital signal processor has an input coupled to said output of said first analog receiver, and a first output; and
a second integrated circuit receiver having a first port coupled to said second port of said first integrated circuit receiver, and a second digital signal processor, wherein said second integrated circuit receiver is coupled to a second antenna and comprises:
a second analog receiver having an input coupled to said second antenna, and an output; and
wherein said second digital signal processor has an input coupled to said output of said first analog receiver, and a second output;
wherein in a first mode, said first integrated circuit receiver reads data from said nonvolatile memory and provides said data to said second port; and
wherein in a second mode, said first integrated circuit receiver provides data from said first digital signal processor to said second port, and wherein said second integrated circuit receiver provides data received from said first port to said digital signal processor thereof.

12. The diversity receiver system of claim 11, wherein said first integrated circuit receiver has a circuit design substantially the same as said second integrated circuit receiver.

13. The diversity receiver system of claim 11, wherein:
said second integrated circuit receiver further comprises a second port; and
the diversity receiver system further comprises a third integrated circuit receiver having a first port coupled to said second port of said second integrated circuit receiver.

14. The diversity receiver system of claim 11, wherein:
in said first mode, said first integrated circuit receiver further stores said data from said nonvolatile memory in an internal memory while also providing said data to said second port.

15. A diversity receiver system comprising:
a nonvolatile memory;
a first integrated circuit receiver coupled to said nonvolatile memory and having a first port, a second port, and a first digital signal processor; and
a second integrated circuit receiver having a first port coupled to said second port of said first integrated circuit receiver, and a second digital signal processor;
wherein in a first mode, said first integrated circuit receiver reads data from said nonvolatile memory and provides said data to said second port; and
wherein in a second mode, said first integrated circuit receiver provides data from said first digital signal processor to said second port, and wherein said second integrated circuit receiver provides data received from said first port to said digital signal processor thereof;
wherein:
said first port of said first integrated circuit receiver comprises a plurality of terminals;
in said first mode, said plurality of terminals operates as a plurality of output terminals; and
in said second mode, said plurality of terminals operates as a plurality of input terminals.

* * * * *